UNITED STATES PATENT OFFICE.

ANTHONY PIRZ, OF LONG ISLAND CITY, ASSIGNOR, BY MESNE ASSIGNMENTS, TO REUBEN C. BARROWS, OF NEW YORK, N. Y.

IMPROVEMENT IN FERTILIZERS.

Specification forming part of Letters Patent No. 209,980, dated November 19, 1878; application filed June 17, 1878.

*To all whom it may concern:*

Be it known that I, ANTHONY PIRZ, of Long Island City, in the county of Queens and State of New York, have invented certain new and useful Improvements relating to Fertilizers, of which the following is a specification:

I combine artificially-made sulphate of lime with phoshate of lime (powdered bones) under proper conditions, and the chemical reactions induced result in the production of a valuable fertilizer.

The sulphate of lime with which I have experimented is a waste product from the manufacture of acetic acid, according to the patent issued to myself and brother, dated March 2, 1869, No. 87,365. It contains some free acid and tarry matter.

I take a hundred pounds (100 lbs.) of powdered or broken bone, and intimately mingle with it an equal weight of the artificial sulphate of lime resulting as a waste product from the manufacture of acetic acid according to the patent above referred to. I add about a hundred pounds (100 lbs.) water, sufficient to thoroughly wet the mass, and then allow it to lie a while at rest. The chemical action which ensues induces a considerable rise of temperature, and after a few hours it is found that the water has been absorbed, and the mass has become a solid of some consistency, which, on being broken up or ground, is available as a valuable fertilizer. It may be used either alone or mixed with other material. Twenty-five per cent. of ashes may be added with advantage, or ten per cent. of Stassfurth muriate of potassa or Stassfurth sulphate of potassa.

I claim as my invention—

The fertilizer described, composed of bone and artificial sulphate of lime, combined as and for the purposes herein specified.

In testimony whereof I have hereunto set my hand this 15th day of June, 1878, in the presence of two subscribing witnesses.

ANTHONY PIRZ.

Witnesses:
SAM. C. SLOAN,
CHAS. C. STETSON.